United States Patent [19]

Nelson et al.

[11] 4,041,187
[45] * Aug. 9, 1977

[54] SOYBEAN BEVERAGE AND PROCESS

[75] Inventors: Alvin I. Nelson; Marvin P. Steinberg, both of Champaign; Lun-Shin Wei, Urbana, all of Ill.

[73] Assignee: The University of Illinois Foundation, Urbana, Ill.

[*] Notice: The portion of the term of this patent subsequent to Aug. 26, 1992, has been disclaimed.

[21] Appl. No.: 588,101

[22] Filed: June 23, 1975

Related U.S. Application Data

[63] Continuation-in-part of Ser. No. 374,581, July 6, 1973, Pat. No. 3,901,978, which is a continuation-in-part of Ser. No. 282,499, Aug. 21, 1972, abandoned.

[51] Int. Cl.$^2$ .............................................. A23L 2/02
[52] U.S. Cl. .................................. 426/598; 426/508; 426/634; 426/656

[56] References Cited

U.S. PATENT DOCUMENTS 3,901,978  8/1975  Nelson et al. ........................ 426/598

OTHER PUBLICATIONS

Hand, Steinkraus, Van Buren et al., "Pilot Plant Studies on Soy Milk," Food Tech., Dec. 1964 pp. 139–142.

*Primary Examiner*—Jeanette M. Hunter
*Attorney, Agent, or Firm*—Barry Kramer

[57] ABSTRACT

A process for preparing a bland, stable, aqueous dispersion of soybeans comprising:
i. providing enzyme active soybean cotyledons, either intact or subdivided, while maintaining the moisture level thereof within prescribed limits;
ii. heating said soybean cotyledons sufficiently to inactivate the lipoxidase enzyme contained therein and to partially tenderize said soybean cotyledons;
iii. further tenderizing said soybean cotyledons until the soybeans exhibit a tenderometer value of between about 16 and about 300 pounds per 100 grams of soybeans on an equivalent whole bean basis; and
iv. homogenizing an aqueous slurry of said tenderized soybeans, said slurry having a soybean concentration of less than about 20% by weight, in at least one pass through a homogenization zone at a pressure between about 1000 and 10,000 psi at a temperature between about 32° F. and a boiling point of the slurry at the pressure within the homogenizing zone, thereby obtaining a bland, stable soybean dispersion.

37 Claims, No Drawings

SOYBEAN BEVERAGE AND PROCESS

CROSS REFERENCE TO RELATED APPLICATIONS

This application is a continuation-in-part of copending application Ser. No. 374,581, filed July 6, 1973, now U.S. Pat. No. 3,901,978 which is, in turn, a continuation-in-part of application Ser. No. 282,499 filed Aug. 21, 1972, which is now abandoned. The disclosures of said applications are incorporated herein by reference.

BACKGROUND OF THE INVENTION

The present invention relates to a soybean beverage base and food products prepared therefrom. More particularly, this invention relates to a soybean beverage base exhibiting enhanced nutritional quality, flavor, stability and palatability and to processes for the preparation thereof.

Soybeans have long been used as a well balanced source of nutrients for both animals and humans. In particular, soybeans are an excellent high protein, low carbohydrate source. Despite these nutritional credits, the use of soybeans, especially as a beverage base, has been quite limited principally because of the undesirable bean-like or "painty" flavor and odor heretofore associated with such beverages. Prior attempts to overcome this problem have been largely unsuccessful. The undesirable flavor and odor are principally caused by an enzyme system, lipoxidase, which catalyzes the oxidation of the polyunsaturated oils and fats in the soybeans. The reaction can take place quickly whenever: (1) the bean cell structure is damaged, as when the bean cotyledons are bruised, cracked or ground, so that the enzyme and oil are permitted to contact each other, and (2) a certain amount of water is present. As little as one part in one billion of the oxidized reaction product can be detected organoleptically and, for this reason, it is difficult and expensive to remove sufficient reaction product to impart a bland taste to the resulting beverage. Thus, it is extremely desirable to prevent the formation of such reaction product.

Soybean beverages, principally employed as a substitute for milk, have been prepared for hundreds of years, especially in the Orient, conventionally, by soaking soybeans in water for several hours, followed in order by grinding with water to thereby extract the protein into the aqueous phase, filtering the resulting slurry to recover the protein-rich extract and cooking the recovered filtrate. Although this process is simple and the resulting beverage is high in protein, the product has the distinct bean-like off-flavor and odor which has now become associated with soybean beverages.

It was subsequently found that various heating techniques such as boiling, steaming or infrared treatment of the beans could reduce the off-flavor of the soybean beverages. It soon was recognized, however, that although heating is necessary to reduce the undesirable bean-like flavor, it has the concomitant effect of insolubilizing or denaturing the protein, thereby substantially decreasing the protein concentration in the filtrate. Consequently, a compromise was effected wherein the heating operation was restricted, thereby retaining some of the bean-like off-flavor, in an effort to retain high protein concentration. This compromise has limited the acceptability of the resulting soybean beverages in the Western world and has confined its salability to such areas as animal feeds and non-allergenic milk substitutes for babies, which collectively form what might be considered a non-complaining market.

As diet consciousness sweeps across the Western world, high protein, low carbohydrate substitutes for milk and other dairy products have come into high demand. As opposed to the non-complaining market which heretofore consumed the bulk of the soybean beverages sold, diet consciousness is a problem generally associated with the adult population whose visual and taste requirements are quite sophisticated. This has resulted in extensive research and developmental efforts to develop a soybean beverage which can be sold as a stable suspension which will not separate on standing, thereby giving rise to the formation of "sludge" in the beverage container. Moreover, there has been great impetus toward significantly improving the palatability of the beverage with respect to taste, odor and mouth feel, i.e., a grainy or sandy feeling in the mouth and throat upon swallowing the beverage.

Recently, attempts have been made to prepare soybean beverages from whole soybeans without including an extraction step. In this manner, most of the nutritional components of the soybean are retained in the beverage, the product yield is higher and the labor costs are reduced. These attempts have been largely unsuccessful, resulting instead, in relatively unstable suspensions and poor flavor and mouth feel. Many attempts have been made to reduce the particle size of the solids in a soybean beverage in order to improve mouthfeel and stability since it was believed that poor mouthfeel and lack of stability of the dispersion were related to the presence of large particles remaining in the beverage. In some instances, the suspension has been centrifuged to separate and remove the larger, heavier particles. In other processes, size reduction has been effected through the use of hammer mills, roller mills, disc mills, disintegrators, and the like. Such size reduction apparatus has been used alone, in combination and in further combination with homogenizing and/or emulsifying apparatus. Nevertheless, permanently stable suspensions have still not been obtained. In many instances, suspending agents or suspension stabilizers are still required. Moreover, none of these techniques have provided a whole soybean product which combines the features of (1) being essentially free of the bean-like or painty, off-flavor normally associated with soybean beverages; (2) maintaining a permanently stable suspension; and (3) exhibiting good mouthfeel.

U.S. Pat. No. 3,901,978 discloses a successful process for preparing a bland, stable aqueous dispersion of whole soybeans comprising:

i. tenderizing intact soybean cotyledons until the soybeans exhibit a tenderometer value of between about 16 and about 300 pounds/100 gms. of soybeans;

ii. heating the intact soybean cotyledons sufficiently to inactivate the lipoxidase enzyme;

iii. forming a slurry of the soybeans and water, said slurry having a soybean concentration of less than about 20 percent by weight;

iv. homogenizing said slurry in at least one pass through a homogenization zone at a pressure between about 1000 and 10,000 psi. at a temperature between about 32° F. and the boiling point of the slurry at the pressure within the homogenizing zone; and, v. recovering a bland, stable aqueous dispersion of whole soybeans.

At the present time, the reasons for the clear superiority of the soybean beverages prepared in accordance with said copending application as compared to the prior art are not completely understood; however, while not wishing to be bound by any proposed theory or mechanism, it is currently believed that the combination of a specific amount of tenderization and a commensurate amount of homogenization results in the formation of hydrophilic lipid-protein complexes which enable the soybean dispersion to remain stable, with no appreciable separation, for over two months. Soybean protein is normally quite hydrophobic. This leads to protein aggregation causing precipitation of the resultant relatively heavy particles. Colloidal stability of a soybean beverage can be defined as the continued maintenance of a homogeneous liquid system, i.e. the absence of the separation, either settling or floating, of the solids within the liquid. The system is not, in fact, a true colloidal system because the particle size of the solids exceeds the range normally considered as being within the colloidal size range. Thus, contrary to the prior art concern for the obtainment of small particle size as a prerequisite for good stability and mouthfeel, it is now believed that hydration of the protein renders it more hydrophilic thereby enabling prolonged suspension thereof. Tenderization of the soybean cotyledon in accordance with said copending application is believed to effect a desirable hydration of the molecular constituents of the soybean, e.g., the proteins, carbohydrates, combinations thereof, etc. Thus, more tenderization, the soybean protein becomes more amenable to subsequent phospholipid-protein complex formation during homogenization. The resulting complex is believed to comprise a protein particle enveloping a core of soybean oil with hydrophilic moieties of phospholipid molecules emanating from the protein particle, said hydrophilic phospholipid moieties tending to create a water sheath about the protein in the aqueous dispersion, thereby imparting a hydrophilic character to the resulting complex. Moreover, because of the soybean oil core, the resulting complex exhibits less density than normal protein particles, thereby assisting in avoiding settling and maintaining the stability of the suspension.

In U.S. Pat. No. 3,901,978, it is disclosed that the soybean cotyledons should be retained intact, i.e., retain their structural integrity (although dehulling in a manner which retains the structural integrity of the cotyledon is specifically contemplated in said copending application), until at least that point in the process wherein the lipoxidase enzyme has been inactivated. It has now been found that under certain conditions, the soybean cotyledons need not be processed in an intact condition, thereby enhancing the flexibility and applicability of the process. Also, it has now been found that the process can be further modified to increase the nutritional value of the resulting soybean beverage while simultaneously effecting a substantial reduction in waste pollution.

SUMMARY OF THE INVENTION

Accordingly, it is an object of the present invention to provide a process for the preparation of a soybean beverage which encompasses but is not restricted to the use of intact soybean cotyledons as the starting material.

It is another object of the present invention to provide a process for the preparation of a soybean beverage from enzyme active soybean cotyledons.

It is still another object of the present invention to provide an improved process for the preparation of a soybean beverage which substantially reduces waste pollution.

It is a further object of the present invention to provide an improved soybean beverage of enhanced nutritional value.

These as well as other objects can be accomplished by the present invention which provides a process for preparing a bland, stable aqueous dispersion of soybeans comprising:

i. heating soybean cotyledons either intact or in subdivided form, sufficiently to inactivate the lipoxidase enzyme contained therein and to partially tenderize said soybean cotyledons;

ii. further tenderizing said soybean cotyledons until the soybeans exhibit a tenderometer value of between about 16 and about 300 pounds per 100 grams of soybeans on an equivalent whole bean basis; and iii. homogenizing an aqueous slurry of 11.4tenderized soybeans, said slurry having a soybean concentration of less than about 20% by weight, in at least one pass through a homogenization zone at a pressure between about 100 and 10,000 psi. at a temperature between about 32° F. and the boiling point of the slurry at the pressure within the homogenizing zone, thereby obtaining a bland, stable soybean dispersion.

DETAILED DESCRIPTION OF THE INVENTION

All known varieties of soybeans can be employed in practicing the present invention. Typical varieties include Hark, Wayne, Amsoy, Corsoy, Clark and the like.

Preferably, for the purposes of this invention, the soybeans can be air-cleaned by conventional means, inspected and off-colored and defective beans as well as foreign matter such as stones can be removed.

It has now been found that organoleptically acceptable bland soybean beverages can be obtained through the process of the present invention not only with intact soybean cotyledons but also when sub-divided soybean cotyledons (hereinafter referred to as "lipoxidase enzyme active soybean cotyledons") are employed along with or in lieu of intact soybean cotyledons. Such subdivision may be due to active steps, such as grinding or cracking the cotyledons, or may be due to damage, bruising or cracking during handling or dehulling. It has been found that even though the bean cell structure has been damaged and the substrate is exposed to the lipoxidase enzyme, the chemical reaction which produces the off-flavor and off-odor will not proceed until adequate moisture is available at the substrate. Although off-flavor development is not dependent upon moisture content alone, but is also affected by such factors as extent of damage, extent of sub-division, storage temperature and duration of storage, moisture content has been found to be the principal factor controlling off-flavor development, especially when the duration of storage is relatively short.

The following example is illustrative of the interrelationship of the moisture content with off-flavor and off-odor development.

Sample Preparation

Good quality raw Wayne 1973 soybeans containing 11.4% moisture were adjusted to various moisture contents by addition of water and equilibration of 34° F. in air tight containers. Separate lots were adjusted to contain 11.4%, 15%, 18%, 25%, and 32% moisture. These five lots were each sub-divided in a Burr Mill to form enzyme active soybean cotyledons. The particle size of lots containing 11.4%, 15% and 18% moisture were determined using U.S. Standard sieves and the results are as follows: 11.4

| U.S. Std. Sieve No. | | % of Total Cracked Beans |
|---|---|---|
| on | No. 5 | 4.4 |
| " | No. 7 | 33.9 |
| " | No. 10 | 33.6 |
| " | No. 20 | 18.6 |
| through | No. 20 | 9.5 |

The sub-divided beans of 25% and 32% moisture contents were considered to be as finely subdivided as those above. However, the moisture content was such that the particles could no longer be separated by dry sieving.

Each lot was divided into two portions. One portion was used immediately for beverage production according to the procedure described below. The second portion was held at 34° F. for 24 hours in air tight containers before being converted into beverage using the same procedure.

All the resulting beverages were held at 34° F. in 16 oz. glass screw-cap bottles until ready for the organoleptic odor evaluation.

Beverage Production Procedure

Five hundred gms. of the sub-divided, enzyme active, cotyledons were dropped into 2500 m. of a boiling aqueous solution containing 0.25% NaHCO$_3$. The solution was maintained at about the boiling temperature at time of contact with the raw soybeans to inactivate lipoxidase enzyme and prevent off-flavor and off-odor. The mixture of NaHCO$_3$ solution and beans was heated in a steam jacketed kettle and kept at a simmer for 20 minutes. At this point, the tenderometer value of the soybeans averaged 294.5 pounds per 100 gms soybean (wet weight).

Both the blanched cotyledons and blanch water, including the kettle rinse, were passed through a Rietz disintegrator with 0.023 inch screen with additional fresh tap water to obtain a slurry with 12% bean solids. The slurry was then heated in a steam jacketed kettle to 200° F. and passed through a single piston, double stage, Manton-Gaulin laboratory homogenizer using 500 psi and 3500 psi pressure for stages 2 and 1, respectively. The homogenized 12% slurry hereafter is referred to as the base.

Eight pounds of the base was then diluted with tap water to about 2.8% protein and the dilution was neutralized with 2.6 ml of 6 N HCl to obtain the desired pH of 7.0 to 7.2. The slurry was then heated in the jacketed kettle with 0.735 lb. of sugar and 0.03 lb. salt to 200° F. The heated slurry was treated with 0.59 ml of an imitation cream flavor and homogenized as before. The resulting beverage was packaged into 1 pint glass bottles and ½ gal. plastic bottles. These were stored undisturbed at 34° F. before organoleptic evaluation.

Evaluation of Sample

The beverage samples were presented to a taste panel consisting of 9 to 12 members on a blind-fold basis in a randomized complete block design. The samples were graded for odor on a 9 point hedonic scale, 9 as excellent odor and absence of beany-painty off-odor, 5 just acceptable, and 1 extremely poor. This evaluation was based on odor, rather than taste, in order to avoid the serious problem of "carry-over" from samples strong in off-flavor to those that were not.

It has been found that the odor acceptance accurately reflects the flavor acceptance of samples.

An analysis of variance was used for each set of date. With each evaluation, the Least Significant Difference (LSD) was applied to determine significant differences among treatment means (Steel, R. G. D. and Torrie, J. H., 1960. "Principles and Procedures of Statistics," McGraw-Hill Book Company, Inc., New York.)

Results

The effects of zero hours holding and 24 hours holding of enzyme active soybean cotyledons at various moisture contents before enzyme inactivation and simultaneous tenderization on an organoleptic odor acceptance were as in Table 1.

TABLE 1

EFFECT OF MOISTURE CONTENT ON ENZYME ACTIVE SOYBEAN COTYLEDONS AT ZERO HOLDING TIME ON THE ODOR ACCEPTANCE OF BEVERAGE

| Moisture Content | 11.4% | 15% | 18% | 25% | 32% |
|---|---|---|---|---|---|
| Score | 6.81 | 6.18 | 6.00 | 5.36 | 3.27 |

*Values above the same underline are not significantly different at the 1% confidence level.

Table 1 shows that odor acceptance of samples from 11.4%, 15% and 18% moisture beans are significantly better than that from samples made from either 25% or 32% moisture beans. The beverage made from 25% moisture beans rated as just acceptable, but product made from 32% moisture soybeans was definitely not acceptable.

TABLE 2

EFFECT OF MOISTURE CONTENT ON ENZYME ACTIVE SOYBEAN COTYLEDONS WHICH WERE HELD AT 34° F. FOR 24 HOURS ON THE ODOR ACCEPTANCE OF BEVERAGE

| Moisture Content | 11.4% | 15% | 18% | 25% | 32% |
|---|---|---|---|---|---|
| Score | 6.00 | 5.12 | 4.75 | 3.50 | 2.25 |

*Values above the same underline are not significantly different at the 1% confidence level.

As shown in Table 2, the organoleptic score of all beverages made from soybeans held for 24 hours was found to be lower than for corresponding beverages made from beans without holding. This indicates that above 11.4% moisture content, raw soybeans will degrade in quality if they are in an enzyme active condition and held for a period of time. After storage, beverage made from 15% moisture beans was barely acceptable and that made from 18% moisture beans was not acceptable. Therefore, an interaction exists between an acceptable moisture content of enzyme active raw soybeans and time of storage before processing to the beverage in regard to obtaining an acceptable bland odor of finished products.

The above example clearly indicates that lipoxidase enzyme active soybean cotyledons must be maintained below a certain critical moisture level in order to obtain acceptable product. Generally, soybeans containing a moisture content of about 20% by weight or less can be suitably employed in the process of the present invention depending on the physical condition of the soybeans and the length of storage.

Normally, soybeans are removed from their pods during harvesting and the intact soybeans can be stored at moisture contents of from about 10 to 13% and at normal ambient temperatures. Storage under such conditions for a year or more will not result in deterioration of the beans. If, however, the soybean cotyledons are to be stored in their enzyme active state, it is preferred that the moisture content be maintained at about 10 to 13% by weight and that storage be kept to a minimum, preferably less than about 48 hours and most preferably less than about 24 hours. Prior to dehulling and sub-dividing of the cotyledons, the raw beans are generally heated to loosen the hulls and to expedite dehulling. This usually reduces the moisture by one or two percent. Preferably, dehulling and/or sub-division of the soybeans should be effected just prior to the step of heating for enzyme inactivation. This avoids the off-flavor development that could occur if the sub-divided cotyledons picked up moisture during holding.

Since enzyme activity must be halted prior to exposure to excessive moisture, e.g., soaking, the lipoxidase enzyme active soybean cotyledons are first heated in order to inactivate the lipoxidase enzyme thereby preventing the bean-like or painty flavor in the final product. Heating of the soybeans to inactivate the lipoxidase can be effected by several different techniques. The soybeans, for example, can be blanched in water at about the boiling temperature for a period of time sufficient to inactivate the lipoxidase. Typically, this requires a minimum of about 5 minutes and generally about 20 to 40 minutes depending upon such variables as bean variety and storage conditions. The blanching also destroys the anti-trypsin factor present in soybeans, thereby improving the nutritional value of the product as well as giving it a completely bland taste as a result of inactivating the lipoxidase present. In the present process, heating can also be effected by direct treatment with steam, pressure cooking or other heat treatment. The heat treatment inactivates the lipoxidase and also partially tenderizes the soybeans thereby accelerating the ultimate tenderization operation.

The full degree of tenderization contemplated in the present invention can be effected by exposing the enzyme-inactivated soybeans to a combination of moisture and heat, either simultaneously or sequentially, until a tenderometer value in the range of from about 16 to about 300 pounds per 100 grams soybeans (wet weight) is obtained. Various methods for obtaining the requisite degree of tenderization are described in U.S. Pat. No. 3,901,978.

The preferred manner of achieving the requisite degree of tenderization when starting with sub-divided cotyledons is by continuing the heat treatment employed for enzyme inactivation until the requisite degree of tenderization is effected. Thus, the cotyledons can be kept in the blanching medium for a sufficient period of time to both inactivate the enzyme and fully tenderize the beans to the requisite degree.

Regardless of the method of tenderization employed, the proper degree of tenderization can be easily determined through use of a L.E.E.-Kramer Shear Press equipped with an electronic recording attachment (Laboratory of Electronic Engineering Washington, D.C.). 100 grams (wet weight) of tenderized beans are placed in the standard test cell (cell No. C274) for each determination. The piston stroke is adjusted to take 14.5 seconds employing a 3000 lb. test ring. Results are expressed as maximum shear force in lbs. per 100 grams of wet weight of soybeans. Employing this procedure, it has been found that in order to obtain the superior soybean beverage of the present invention, tenderization of the soybeans must first be effected to a tenderometer value in the range of from about 16 to 300 pounds per 100 grams (wet weight) soybeans. The lower limit is specified as about 16 pounds per 100 grams only because this is the minimum reliable value that can be read on the L.E.E.-Kramer Shear Press with the test cell employed. Tenderization of this value gives a satisfactory product. Some additional tenderization beyond this point may also give a satisfactory product. However, it has been found that the tenderization step can be overdone; although overtenderization does not affect stability, it does have a detrimental effect on mouth feel. Overtenderization can occur, for example, if blanching is conducted for an excessive period of time such as about 70 minutes or if several tenderization procedures are combined. If the beans are insufficiently tenderized beyond a tenderometer value of about 300 pounds per 100 grams, the resulting beverage will be unsatisfactory in either colloidal stability or mouth feel or in both. While combinations of procedures can be employed in the present invention, the degree of tenderization should be periodically determined to ascertain the proper duration of treatment.

Tenderization of Sub-divided Cotyledons

Wayne 1972 soybeans having a moisture content of about 12% were cracked in a Burr mill and air classified to remove hull and hypocotyl (germ).

The cotyledons were then further cracked into smaller pieces using the Burr mill and classified by means of U.S. standard sieves from No. 5 to No. 18 screens. Various sizes of the cracked soy cotyledons were classified according to the smallest size of wire sieve used. Seven samples ranging in size from 5/32 in. × ⅜ in. (cotyledon, dehulled) to 0.039 in. were obtained.

Each sample was blanched for 20 min. in. 0.25% NaHCO$_3$ solution at a bean to solution ratio of 1 to 5. This blanching was sufficient to inactivate the lipoxidase enzyme. The blanched beans were drained and cooled to room temperature with tap water. The tenderness of the beans was then measured with a L.E.E. Kramer Shear Press using a No. C274 shear cell with a 3,000 lb. test ring, 100 grams moist sample size and 14.5 second stroking time in the manner described hereinabove.

The results of this test are as follows:

| Sample | Piece Size, inches | Max. Shear Force in lbs. |
|---|---|---|
| Cotyledon, dehulled | 5/32 × 3/8 | 294.5 |
| Cracked | 0.157 | 277.5 |
| " | 0.111 | 238.5 |
| " | 0.097 | 171.0 |
| " | 0.0787 | 153.5 |
| " | 0.0555 | 125.0 |
| " | 0.0394 | 72.5 |

Satisfactory beverages as herein defined and described were obtained from each of the above soybean samples after further processing in accordance with the present invention.

These results clearly establish that satisfactory beverages can be obtained from sub-divided soybeans despite their initial enzyme active state through proper control of moisture content and process sequence. The above data also establishes that use of sub-divided soybeans provides a means for achieving the requisite degree of tenderization in a shorter period of time or a greater degree of tenderization in a given period of time. Of course, as described hereinabove, when operating with sub-divided cotyledons prior to lipoxidase inactivation, it is important to maintain proper control of the moisture content of the cotyledons.

After lipoxidase inactivation, the soybeans, whether initially intact or in an enzyme active state can be sub-divided or further sub-divided for further tenderization, if required to reach their desired degree of tenderization.

After tenderization, the blanching solution can be drained off, if desired, and the cotyledons, whether intact or sub-divided, can be washed with water or can be treated in other ways. It is convenient to dehull the beans at this point if they have not been dehulled before, if a less creamy product with lower fiber content is desired. As described above, the hulls can be removed earlier while the beans are kept under controlled moisture conditions, but a satisfactory product is obtained if the hulls are not removed at all. It has been found that by dehulling, the resultant product does have a lower fiber content and viscosity. Thus, one factor in determining whether or not to dehull is the desired final viscosity and fiber content.

It has also been found that retention of the various soak and blanch liquors employed in the enzyme inactivation and tenderization sequences of the process can significantly enhance the process economics as well as improve the nutritional value of the product.

If the soak and blanch liquors are separated from the soybeans, they represent relatively strong waste streams. Disposal of such waste streams consistent with current pollution requirements could increase production costs significantly. It has now been found that these liquors can be retained and employed in the formation of the aqueous soybean slurry with beneficial effects on the resulting beverage product and with reduced processing costs.

Partial or complete retention of the soak and/or blanch liquors results in increased nutritional value based upon retention of protein and other nutrients that are lost upon disposal of the soak or blanch liquors. In addition, reduced handling of the soybeans and elimination of separation and waste disposal operations significantly reduces processing costs.

The flexibility and advantages afforded by the processes of the present invention are many.

A beverage of substantially reduced viscosity can be prepared. Many tasters have stated that beverages made from whole soybeans (including the hull) are too viscous as compared to cow's milk. Elimination of the hull reduces fiber by about 50%. Soybeans can be lipoxidase inactivated and tenderized in one operation which is generaly shorter in time than that required for blanching whole beans that have previously been soaked. Thus, there is a saving of time and energy by use of dehulled raw cotyledons.

Use of dehulled raw soybeans for preparation of the soybean beverage also results in better color. Tests have shown that homogenized hulls, in the proportion normally found in beverage made from whole soybeans, are brown or rusty in color. Thus, removal of these hulls will enable production of a whiter end product.

Organoleptic tests indicate that beverage prepared with dehulled raw cotyledons is somewhat superior in mouth feel to beverage prepared from whole soybeans. The use of dehulled beans for preparation of the beverage is basically compatible with the pollution reduction methods disclosed herein.

Thus, for example, the dehulled raw beans can be blanched for 15 to 20 minutes and then ground with the blanch water in a Rietz or Fitzpatrick hammer mill. At this point, a substantially reduced amount of sodium bicarbonate (which, when employed, is believed to enhance the rate of tenderization) can be added to the ground slurry (0.05% as compared to 0.5% which is recommended for use when whole soybeans, including hulls, are used) and the material can be held for about 20 minutes at about 180° F. to achieve the requisite tenderization of the soybean tissue. The finely ground slurry allows intimate dispersion and contact of the sodium bicarbonate with the tissue. Thus, a lower concentration of sodium bicarbonate is required to obtain complete tenderization of tissue. Another advantage of the use of the reduced amount of bicarbonate in the slurry is that the resulting pH of the beverages is in the range of 7.1 to 7.2 which requires no neutralization with acid. This again reduces processing costs. In addition, the reduced use of sodium bicarbonate offers a very real saving in production costs, especially for volume producers of soy beverages.

Conversion of the soybeans into an aqueous slurry having a soybean concentration of less than about 20 percent by weight can be effected at any point in the process after the lipoxidase enzyme has been inactivated and before homogenization. Thus, the enzyme-inactivated soybeans can be slurried either before or after complete tenderization.

An aqueous slurry of the tenderized beans is made by wet milling or grinding. The moisture content is adjusted at this stage. A slurry concentration of from about 10 to 15% by weight of soybean solids is preferred. Suitably, milling can be effected with any conventional mill such as a hammer mill (Fitzmill), roller mill, disc mill, Rietz disintegrator, or the like which will readily break up the beans to form a slurry. One or more wet milling steps can be utilized. Other conventional milling procedures and apparatus can be employed and give comparable results. Milling is not considered critical to the present invention. The purpose of milling is to reduce the particle size of the beans so as not to clog or damage the valves of the subsequently employed homogenizer. Thus, depending upon the capacity or capability of the homogenizer employed, milling may be dispensed with altogether. However, for most efficient operation, it is considered preferable to reduce the particle size of the beans to less than about 0.25 inch and most preferably, the particles are milled to a size at least as fine as a Fitzmill No. 1 screen to give an easy-to-handle slurry. During the milling operation, water is added to the soybeans to form a slurry having a solids concentration of less than about 20% and preferably, about 10 to 15%. The slurry concentration is not considered critical and is dependent upon the viscosity which can be conveniently handled by the homogenizer. Generally, a concentration of less than about 20% is employed, most preferably however, the slurry concentration is less than about 12%. As the slurry concentration decreases, the temperature and pressure requirements within the homogenizer become commensurately less severe to effect the same degree of homogenization.

The resulting slurry is thereafter subjected to homogenization under pressure. It has been found in accordance with the present invention that the minimum degree of homogenization required to obtain the superior soybean beverage products of the present invention is inversely related to the degree of tenderization of the soybeans, i.e., as the soybeans become more tenderized, the homogenization conditions, e.g., pressure, temperature, and the number of passes or stages through the homogenizer can be reduced or become less severe. In general, homogenization of the soybean slurry can be effected at pressures ranging from about 1000 to about 10,000 psi with the slurry temperature ranging from about 32° F to about the boiling point of the slurry at the pressure maintained within the homogenizer. Conditions of temperature and pressure within the homogenizer must be maintained so that the slurry is maintained essentially in the liquid state at all times; otherwise, processing difficulties will be encountered within the homogenizer. It has been observed that slurry temperature and homogenizing pressure vary inversely, i.e. to effect a given degree of homogenization at low slurry temperatures, higher pressures should be employed and conversely, lower pressures within the range set forth should be employed at higher slurry temperatures. As indicated hereinabove, the severity of the homogenization conditions can be further lessened if the slurry concentration is decreased. Also, the degree of homogenization will depend upon the number of passes through the homogenizer or passage through a number of stages in a given homogenizer.

As described hereinabove, the soybeans are tenderized to a degree such that they exhibit a tenderometer value ranging from about 16 to about 300 pounds per 100 grams soybeans and preferably, exhibit a tenderometer value of from about 16 to less than about 185. It has been found that depending upon the degree of tenderization of the soybeans, commensurately more or less stringent homogenization conditions will be required to obtain a superior product. Thus, for example, if soybeans are tenderized in accordance with the present invention to a tenderometer value of 165 pounds per 100 grams of soybeans, a superior soybean beverage is obtained by homogenization of a 12% slurry of such beans at a slurry temperature of 180° F upon passing the slurry through the homogenizer twice at 3500 psi. In comparison, beans tenderized to a tenderometer value of only 250 require, for obtainment of a superior product, more stringent homogenization at a slurry temperature of about 210° F. by passing twice through the homogenizer at a pressure of about 5000 psi. Homogenization of this latter slurry under the conditions employed for the former-described slurry, will result in a beverage of only borderline acceptability. Thus, it has been found that beans tenderized to a tenderometer value ranging from about 16 to less than about 185 can be homogenized under relatively mild conditions to provide a superior beverage. Generally, assuming a slurry concentration of 10% to 15%, homogenization can be effected in at least one and preferably two passes (or stages) through the homogenizer at pressures ranging from 1000 to less than about 6000 psi and slurry temperatures ranging from about 32° F to about the boiling point of the slurry at the system pressure. Preferably, such slurries are homogenized at about 180° F. by passing the slurry twice through the homogenizer at about 3500 psi. When, however, the beans are tenderized to a tenderometer value ranging from about 185 to about 300, it has been found that successful homogenization can be effected by passing the slurry, at temperatures ranging from about 180° F. to about the boiling point of the slurry under the system pressure, through the homogenizer at least once and preferably twice, at pressures ranging from greater than about 6000 to about 10,000 psi. If the pressure is sufficiently high during the first pass, i.e., about 8,000 to 10,000 psi, the pressure in the second pass can be lower, e.g. about 3500 to 6,000 psi., if desired. Of course, as indicated above, required homogenizer conditions will become more severe, i.e. higher pressures and/or temperatures, as the slurry concentration is increased up to about 20%.

If alkaline solutions are employed at any point in the process, it is considered preferably although not necessary that the final product be neutralized by addition of an acid such as hydrochloric acid prior to the last homogenization. As described hereinabove, neutralization can essentially be omitted when reduced amounts of sodium bicarbonate or other alkaline material are employed to enhance the rate of tenderization.

A wide variety of additives can be added to the beverage of the present invention most conveniently just before the last homogenization. Thus, flavorings, sugar, salt and the like can be added, as desired. The beverages of the present invention, as distinguished from the prior art, do not require stabilizers, emulsifiers and the like to maintain stability of the dispersion upon storage. Moreover, the beverage of the present invention remains stable and does not separate regardless of its ultimate dilution or viscosity and regardless of whether it is prepared with or without inclusion of the soybean hulls. In addition, the product of the present invention can utilize the whole bean including the hulls. In contradistinction to many prior art processes, there is no need in the present invention to remove any of the bean constituents in order to obtain a stable product.

If the slurry has been heated sufficiently before homogenization, there is generally no need to pasteurize the soybean beverage separately. If, however, lower homogenization temperatures are employed, the resulting beverage must be pasteurized to at least partially sterilize the beverage. The pasteurized beverage can then be bottled, spray-dried, freeze-dried or the like. The pasteurized beverages will remain stable until residual microbial action generates sufficient acid to gel and thus spoil the product. Alternatively, the beverage can be sterilized and canned, or condensed, sterilized and canned. The sterile, canned product has remained stable for over two years.

The homogenized whole bean slurry, the basic product of the present invention, is rich-tasting although relatively low in fat content which, advantageously, is liquid (unsaturated) soybean oil and contains no cholesterol. There is no objectional mouth or throat feel; and of course, since the lipoxidase has been deactivated, there is no discernable bean-like or painty flavor. The beverage base is a non-settling, non-creaming dispersion which is less susceptible to microbiological deterioration than whole cow's milk. Refrigeration at 45° F. or lower will prevent spoilage at room temperature or the product can be preserved by canning or dehydration.

The stable, bland soybean dispersion obtained in accordance with the present invention can be employed in accordance with the present invention as a palatable, nutritious beverage base for a wide variety of products such as soy milk, flavored spreads or dips, yogurt, diet margarine, soybean butter, custard, oriental tofu and the like.

The following examples further define, describe and compare methods for preparing the soybean beverage base of the present invention and of utilizing said base to prepare useful food products. Parts and percentages are by weight unless otherwise indicated.

EXAMPLE 1

Preparation of Soybean Beverage from Enzyme Active Soybean Cotyledons Without Liquid Waste Wayne soybeans (raw) containing 11.4% moisture were heated in a Proctor & Schwartz air drier with downflow air at 200° F. for 5 minutes. The bed of beans was ½ to 1 inch depth in the trays. The pressure drop of air flow through the tray was 0.1 inch water.

The heated beans (without cooling) were then passed through a Burr mill spaced between 3/16 inch to 5/32 inch (slightly smaller than size of whole soybeans) to split the cotyledons. The split beans with loose hulls were then passed through a Key air cleaner for removing loose hulls. The dehulled beans were essentially intact cotyledons but contained some hypocotyl. Such beans are active in lipoxygenase and trypsin inhibitors. Hereafter, the cotyledons obtained from the Key air cleaner are referred to as enzyme active soybean cotyledons. When 76 lbs. raw soybeans of the Wayne variety were treated as described above, the yield of enzyme active cotyledons was 92%.

Since the hull constitutes 8% of the raw soybeans and contains very little protein, it is concluded that this yield of 92% represents essentially 100% protein recovery.

Five hundred gms. of enzyme active soybean cotyledons were dropped into 2500 ml. of boiling water containing 0.25% NaHCO$_3$. The solution must be at or near boiling temperature at time of contact with the raw soybeans to inactivate lipoxygenase enzyme and present bad flavors. The mixture of solution and beans was heated in a steam jacketed kettle and kept at a simmer for 20 minutes. At this point, the tenderometer value of the soybeans was 294.5 pounds per 100 gms. soybeans (wet weight).

Both the blanched cotyledons and blanch water, including the kettle rinse, were passed through a Rietz disintegrator with 0.023 inch screen with the addition of fresh tap water to obtain a slurry with 12% bean solids. The slurry was then heated in a steam jacketed kettle to 200° F. and passed through a single piston, double stage, Manton-Gaulin laboratory homogenizer using 500 psi and 3500 psi pressure for stages 2 and 1, respectively. The homogenized 12% slurry hereafter is referred to as the base.

When the soy beverage base is prepared in this manner, i.e., without liquid waste, then the final food product contains 100% of the protein present in the whole, raw soybeans.

Eight lbs. of the base was then diluted with tap water to about 2.8% protein and the dilution was neutralized with 2.6 ml. of 6 N HCl to obtain the desired pH of 7.0 to 7.2. The slurry was then heated in the jacketed kettle with 0.735 lb. of sugar and 0.03 lb. salt to 200° F. The heated slurry was treated with 0.59 ml. of an imitation cream flavor and homogenized as before. The resulting beverage was packaged into 1 pint glass bottles and ½ gal. plastic bottles. These were stored undisturbed at 34° F. before organoleptic evaluation. The beverage was evaluated to be excellent in flavor and mouth-throat feel. This beverage is also nonsettling and colloidally stable in refrigerated storage during the entire period of several days evaluation.

EXAMPLE 2

Preparation of Soybean Beverage from Enzyme Active Soybean Cotyledons with Reduced Liquid Waste Two pounds of enzyme active soybean cotyledons, prepared as described in Example 1, were dropped into 6 lbs. of boiling tap water and simmered for 5 minutes. The blanched cotyledons were then separated from the blanch solution with a strainer. The degree of tenderization of the cotyledons was measured with a L.E.E. Kramer Shear press using 100 gm. (wet weight) of cotyledons in the standard test cell (cell C 274). The piston stroke was adjusted to take 14.5 seconds employing a 3000 lb. test ring. The tenderometer value was 645 pounds per 100 grams (wet weight). The blanch water was discarded; it weighed 4 lbs. and contained 2.67% solids. Therefore, this process generates liquid waste containing 5.34% of the original enzyme active cotyledon solids.

The water-blanched cotyledons were then heated in 10 lbs. boiling water containing 0.25% NaHCO$_3$ (1.25% of the raw enzyme active cotyledons) for 25 minutes. The degree of tenderization of the blanched cotyledons measured with the shear press gave a tenderometer value of 258 lbs. per 100 gm. (wet weight) samples. The blanched cotyledons and the solution were then quantitatively passed through a Rietz disintegrator (0.023 inch screen) with make up water to give a soybean slurry of approximately 12% solids. This slurry was heated and further treated as described in Example 1. The resulting beverage was found to have excellent flavor and stability (see Table I below).

EXAMPLE 3

Two pounds of enzyme active cotyledons prepared as described in Example 1 were blanched by dropping directly into six pounds boiling tap water for 15 minutes. The blanched cotyledons were then separated with a strainer and the blanch water (3.0 lbs. containing 4.75% solids) was discarded. The bean solids contained in the blanch solution were calculated to be equivalent to 7.12% of the coltyledons processed in this procedure. The degree of tenderization of the blanched, partially tenderized cotyledons measured by the shear press gave a tenderometer value of 540 lbs. on 100 gm. wet sample.

The blanched cotyledons were then passed through a Rietz disintegrator with enough fresh water calculated to give a 12% bean solids slurry. NaHCO$_3$ was then added to the bean slurry at 0.05% on the liquid basis. The slurry was heated to 212° F. and held at a simmer for 20 minutes. The slurry cannot be evaluated for tenderness with the L.E.E.-Kramer Shear Press. However, extrapolation of bean tenderness made on the basis of total blanching time and conditions and subdivided cotyledon condition, e.g., particle size, can be estimated. Thus, the extrapolated degree of tenderization was 100 lbs. per 100 gms. The heated slurry was then homogenized to obtain the base. Eight pounds of the base were then diluted with water to 14.7 lbs., neutralized with 0.35 ml. 6 N HCl, flavored with sugar, salt and imitation cream flavor, heated to 200° F., homogenized and bottled as described in Example 1.

The resulting beverage was found to have good flavor and excellent stability. The results are summarized in Table I below.

EXAMPLE 4

Seven pounds of enzyme active soybean cotyledons were blanched in 35 lbs. of soft water for 20 minutes. The cotyledons after blanching were partially tenderized and gave a tenderometer value of 510 lbs. on 100 gm. wet sample. Both the blanch water and blanched cotyledons were the quantitatively passed through the Rietz disintegrator with 0.023 inch screen with additional water calculated to give 12% solids. This resulted in 52.5 lbs. slurry at pH 6.45.

The slurry was then heated to boiling and simmered for 20 minutes. The degree of tenderization of the soybeans was again estimated as 100 lbs. per 100 gm. The heated slurry was then homogenized as in the Example 1. Eight pounds of this base (pH 6.55) were then diluted with tap water to 14.7 lbs. (pH 6.4), flavored with an (0.59 ml.) imitation cream flavor and homogenized as in Example 1. The finished beverage was then bottled and held at 34° F. undisturbed until evaluation. The results are summarized in Table I below.

EXAMPLE 5

Seven pounds of enzyme active soybean cotyledons were water blanched, tenderized, ground through the Rietz disintegrator and homogenized as in Example 4.

Eight pounds of this base were diluted with water to 14.7 lbs. and the pH was adjusted to 7.2 with 20% NaOH solution.

The slurry was then flavored, heated, homogenized, bottled and stored as in Example 4. The results are summarized in Table I below.

EXAMPLE 6

Seven pounds of enzyme active soybean cotyledons were water blanched, ground through the Rietz disintegrator and homogenized as in Example 4.

1.25% NaHCO$_3$ was added to the slurry on the basis of bean solids (0.17% on basis of slurry), heated to boiling and held at a simmer for 20 minutes. The pH was 7.6. The heated slurry was then homogenized as in Example 1. The pH was 7.82. Eight pounds of this base were then diluted with water to 14.7 lbs. and neutralized with 6 N HCl. Then, it was flavored, heated, homogenized, bottled and stored as in Example 5. The results are summarized in Table I below.

EXAMPLE 7

Seven pounds of enzyme active soybean cotyledons were water blanched for 20 minutes, ground with the blanch water and solids adjusted with fresh water, 1.25% NaHCO$_3$ added on dry bean basis (0.17% slurry basis), heated and simmered for 20 minutes as in Example 6. The slurry was then neutralized with HCl.

Homogenization was carried out as in Example 6. The eight pounds of base obtained were diluted with water to give a protein content similar to that obtained in Example 6. This slurry was then flavored, heated, homogenized, bottled and stored as in Example 6. The results are summarized in Table I below.

EXAMPLE 8

Four pounds of enzyme active soybean cotyledons were blanched for 15 minutes in 12 lbs. of soft water. Both the blanch water and blanched cotyledons were then ground with additional fresh water to make a slurry containing 12% solids as in Example 1. During grinding and subsequent homogenization, however, live steam was injected in the grinder intake and homogenizer outlet to give a steam blanket to reduce aeration. A trace of bicarbonate, 0.05% on a slurry basis, was added before homogenizing. The base obtained from the first homogenization was then diluted with water and processed into soybean beverage as in Example 7. No neutralization was needed. The beverage produced was colloidally stable and excellent in flavor and mouth-throat feel. The results are summarized in Table I below.

It is currently believed that use of a steam blanket during slurry formation and/or homogenization improves the nutritional value of the protein and enhances the flavor of the resulting beverage.

EXAMPLE 9

Four pounds of enzyme active soybeans were water blanched, ground and homogenized to give a base as described in Example 8. The beverage base was then diluted with water and flavored with sugar and salt as in Example 8. A steam blanket was used during grinding and homogenization. The hot slurry was then deaerated in a vacuum pan before addition of imitation cream flavor and homogenizing as in Example 8. The bottled beverage was then stored at 34° F for later evaluation. The beverage was shown to be colloidally stable in storage and excellent flavor and mouth-throat feel. The results are summarized in Table I below.

ORGANOLEPTIC AND OBJECTIVE EVALUATIONS OF STORED BEVERAGES PREPARED IN ACCORDANCE WITH THE PRESENT INVENTION

The methods described in copending U.S. patent application Ser. No. 374,581, were used to evaluate organoleptic quality and colloidal stability after storage for six days at 34° F.

The results of the organoleptic evaluation and the colloidal stability (as shown by protein analysis from top and bottom of bottle) ae shown in Table I below. The samples were all kept undisturbed in bottles before evaluation.

The results in Table I indicate that products manufactured as described in the above Examples covering processes with considerable amount of waste to zero waste using either NaHCO$_3$ or water are all highly acceptable in quality on both subjective and objective evaluations.

TABLE I
COLLOIDAL STABILITY AS DETERMINED BY PROTEIN DISTRIBUTION IN SAMPLES STORED UNDISTURBED FOR 6 DAYS AT 34° F AND ORGANOLEPTIC QUALITY EVALUATED BY A 12 MEMBER PANEL

| Samples described in | Panel mean scores[*1] for beverages produced by present invention | | | | | Protein % determined by [*2] Kjeldahl on samples from bottles stored for 6 days in 34° F (% on liquid basis) | |
|---|---|---|---|---|---|---|---|
| | Flavor | Absence of beany flavor | Throat and mouthfeel | Degree of separation | Sludge Evaluation | Top | Bottom |
| Example 2 | 8.3 | 8.5 | 8.3 | 9.0 | 9.0 | 2.40 | 2.60 |
| Example 3 | 7.9 | 8.6 | 8.2 | 9.0 | 9.0 | 2.79 | 2.82 |
| Example 4 | 7.2 | 7.7 | 8.0 | 7.8 | 9.0 | 2.62 | 3.15 |
| Example 5 | 7.6 | 8.1 | 7.7 | 8.3 | 9.0 | 2.82 | 3.05 |
| Example 6 | 8.0 | 8.3 | 8.5 | 9.0 | 9.0 | 2.77 | 2.81 |
| Example 7 | 8.0 | 8.5 | 8.2 | 9.0 | 9.0 | 2.66 | 2.75 |
| Example 8 | 7.8 | 8.4 | 8.1 | 9.0 | 8.9 | 2.69 | 2.67 |
| Example 9 | 8.0 | 8.8 | 8.3 | 8.9 | 8.9 | 2.83 | 2.91 |

[*1] 9 point hedonic scale, 9 as excellent, 5 as barely acceptable.
[*2] Mean content of protein determination on liquid basis was done on duplicate samples from duplicate bottles.

EXAMPLE 10

Three pounds of enzyme active cotyledons were added to 9 lbs. of boiling water containing 17 gm. NaHCO$_3$ (1.25% on basis of dry cotyledones) and simmered for 20 minutes. The blanched cotyledons and blanch solution were quantitatively transferred to a Rietz disintegrator and ground through 0.023 inch screen with additional fresh tap water to form a slurry of 12% bean solids. The slurry was heated to 200° F and then passed through the homogenizer adjusted to 500 psi for the second stage and 3500 psi for the first stage to give the beverage base.

Three parts of this base were then diluted with one part of cottage cheese whey and then neutralized with NaOH to pH 6.8 – 7.2. It was then flavored with 2% sugar and 2% cerelose before being pasteurized by heating to 180° F. The mixture was then homogenized as above. This homogenized mixture is referred to as the soy yogurt base.

The soy yogurt base cooled to 40° C. was then inoculated with 3% (liquid basis) of a standard yogurt culture and incubated at 40° C. for 4 to 4½ hours. The pH of the mixture after incubation was about 3.9 due to the acid produced by the fermentation. This mixture was then cooled in ice water to about 70° F. before flavoring with 20 to 25% of yogurt fruit flavor preserves (about 65% soluble solids). The products were then packaged in samll yogurt containers and stored at 34° F. for evaluation.

Both fruit flavored yogurt made with peach and strawberry were rated excellent in texture and flavor. These products are also stable in storage without syneresis (liquid separation) even though no gelatin was added. Further, the soy yogurt made according to this example was found to contain both *Lactor-bacillus bulgaricus* and *Streptococcus thermophilus* in approximately a 1 to 1 ratio.

This example of gelling with acid (produced by fermentation) indicates that all soy beverages manufactured without liquid waste, as in Example 1, also retain soy protein functionality and can be manufactured into diet spread, tofu, curd, frozen dessert and the other products described in U.S. Pat. No. 3,901,978.

EXAMPLE 11

This example illustrates the extent to which the processes of the present invention effect a reduction in the concentration of pollutants in the waste streams emanating from said processes.

In order to evaluate the present invention, the amount of bean solids leached from whole raw soybeans and from cotyledons in case of both bicarbonate and water soaking for 10 hours or overnight were evaluated.

When two pounds of whole hull-containing soybeans (raw) were soaked for 10 hours at room temperature with 6 lbs. of tap water, the liquid waste weighed 3.5 lbs. and contained 0.685% dry matter and 0.16% protein on a liquid basis. This waste is equivalent to 1.2% of the total solids and 0.7% of the protein in the dry beans used in the process.

If a 0.5% bicarbonate solution is used instead of tap water and soaking is effected overnight, the amount of leaching is slightly greater. The test from 2 pounds whole raw soybeans showed that 3.6 lbs. liquid waste were obtained. This waste contained 0.94% bean solids and 0.17% protein on liquid basis. Therefore, the amount of waste generated by overnight soaking in bicarbonate is equivalent to that of 1.7% of the bean solids and 1.0% of the protein.

A test on two pounds of enzyme active cotyledons with overnight soaking at room temperature in both tap water and 0.5% bicarbonate solution showed that a much greater leaching took place. The amount of liquid waste for the water soak showed that the liquid waste contained solids equivalent to 10.6% of the total bean solids and 2.96% of the protein of the cotyledons used in the soaking. Use of bincarbonate (0.5%) for soaking enzyme active cotyledons also generated considerable amounts of waste in the liquid. The test results shows that the total bean solids and bean protein lost as liquid waste were equivalent to 10.8% and 3.11% of the cotyledons, respectively. Of course, the resulting beverage made from soaked, enzyme active cotyledons was marked by the beany or painty off-flavor and odor associated with failure to inactivate the lipoxidase enzyme.

The solids in the waste stream obtained in accordance with Example 1 of U.S. Pat. No. 3,901,978, in both bicarbonate soaking and bicarbonate blanching were equivalent to 7.8% of total bean solids and 1.6% of protein in dry whole soybeans used in the beverage processing. The direct bicarbonate blanching of cotyledons as described in said patent application showed total leaching to be equivalent to that of 10.05% total bean solids and 1.98% protein of cotyledons used for beverage processing. This amount of waste is in a range similar to that shown for overnight water soaking of cotyledons obtained by conventional processes.

The amount of liquid waste generated in Examples 2 and 3 of the present invention showed much reduced wastes of 5.34% and 7.13% total bean solids from cotyledons used for beverage manufacture. This leaching can be greatly reduced if a 30 second water blanching is used before processing cotyledons according to Example 2. The results of this experiment showed that the amount of waste generated in this procedure was equivalent to only 2.04% total bean solids and 0.35% protein of cotyledons used in the beverage manufacture.

Beverages manufactured according to Examples 4, 5, 6, 7, 8 and 9 produced no liquid waste. Therefore, the amount of leaching or solids lost from cotyledons was zero. More important, these processes all resulted in beverages of excellent mouth-throat feel, flavor, off-flavor and colloidal stability with quantitative recovery of all the solids contained in soybeans.

EXAMPLE 12

This example evidences the formation of an aqueous phospholipid-protein complex dispersion through the process of the present invention.

Hexane extraction is the industrial method for extracting oil from soybeans; of the original about 20% soybean oil, all but about 1% is extractable with hexane.

Enzyme inactivation and subsequent drum drying (heating) of whole soybeans does not result in complexing as is obtained in the present invention: drum dried flakes made from enzyme inactive Hark soybeans showed 17.8% fat by Soxhlet extraction with hexane.

A milk shake prepared from the beverage base of the present invention showed zero fat by the same extraction analytical procedure. To a homogenized 12% base obtained in accordance with Example 1 was added water, sugar flavor, stabilizer (gum) and coconut oil to equal 3% of the finished product. The mix was then heated and homogenized a second time. A sample was freeze dried and the resulting powder was placed in a Soxhlet extraction apparatus with the same solvent as above. No fat was recovered from the solvent showing that the protein complexed not only with the native soybean oil but also with the added coconut oil as well.

It is known that hexane, a non-polar solvent, dissolves only non-polar compounds, i.e., when fat is complexed with protein it becomes polar. One method of determining complexed fat is to digest the mixture with concentrated sulfuric acid. This solubilizes the protein and frees the fat which then rises as a layer of fat on water where it is measured.

The so-called "Babcock" test developed for the dairy industry was applied to the soy beverage of the present invention containing, in this sample, 3.1% protein. Taking the usual ratio of 2 parts protein to 1 part fat in soybeans, the expected fat concentration was 1.65%. The test showed 1.70% fat, indicating complete recovery within experimental error.

Since the beverage must be digested with sulfuric acid to "free" the fat which is not soluble in hexane, this is positive evidence of complex formation.

Although this example illustrates that all of the soybean oil is complexed with the soybean protein, it is currently believed that an acceptable product can be obtained with a major amount i.e., greater than 50% of the soybean oil complexed while a minor amount of the soybean oil, preferably less than about 10 to 15% remains uncomplexed.

EXAMPLE 13

Wayne variety bin-run soybeans were passed through a Key cleaner which used size separation and air aspiration to remove foreign material. The cleaned beans were soaked in a solution of 0.5% sodium bicarbonate in tap water at room temperature for about 10 hours; the ratio was 1 gallon solution for each 4 lbs. beans. This solution was drained and discarded. The soaked beans were transferred to a steam jacketed kettle containing fresh, boiling 0.5% sodium bicarbonate solution in a ratio of 2 gallons to 10 lbs. soaked beans and boiling continued for 30 minutes. The blanched solution was drained and discarded. The blanched beans exhibited a tenderometer value of below 180. The blanched beans were passed through a Burr mill with the plate to plate distance adjusted to break the beans into 2 or 3 pieces. This loosened the hulls so they could be floated off by flushing with room temperature tap water. Sufficient tap water was added to the dehulled soybean pieces to make 12% total solids. The suspension was then passed through a hammer mill (Fitzmill) using a No. 4 screen (0.25 inch openings). The resulting slurry was again passed through the same hammer mill but this time using the No. 1 screen (0.028 inch openings). The second slurry was placed in a steam jacketed kettle and heated to 200° F. The hot slurry was pased through a single piston, single stage, Manton-Gaulin laboratory homogenizer using 3500 psi pressure. This beverage base was diluted with tap water to about 2.8% protein and neutralized with 6N HCl to obtain the desired pH of 7.0 to 7.2. The remaining procedure was standard and is described in Example 1. Finished product was held undisturbed at 34° F. before organoleptic evaluation.

EXAMPLE 14

Preparation of Soybean Beverage from Raw (Enzyme Active) Dehulled Soybean Cotyledons.

Wayne variety, bin-run soybeans were passed through a Key Cleaner which used size separation and air aspiration to remove foreign material. The cleaned beans were placed in a Proctor-Swartz atmospheric tray drier and subjected to thru flow air at a temperature of 210° F. for 20 minutes. This treatment tends to break down the gelatinous fiber that partially binds the hull to the cotyledons and the high temperature tends to effect a plastic-like texture of te cotyledons. The latter is very important because it tends to reduce damage, breaking or crushing of the cotyledons during dehulling. Then, dehulling of the warm, whole raw soybeans was effectively accomplished in a drum dehuller. After the dehulling operation, the hulls and germs were separated from the cotyledons by size separation and air aspiration in a Key Cleaner. The individual cotyledons have some damaged areas where lipoxidase and substrate are released. Therefore, soaking is omitted and the enzyme active cotyledons were dropped directly into a boiling, tap water solution containing 0.25% sodium bicarbonate in a ratio of 5 lbs solution to 1 lb cotyledons; boiling was continued for 30 minutes. The blanch solution was drained and discarded. The blanched cotyledons exhibited a tenderometer value of about 200. The blanched cotyledons were used to prepare a beverage base as described in Example 13 and this base was used to prepare an excellent tasting beverage as described in Example 1 and 13.

EXAMPLE 15

A soy beverage base was prepared as in Example 13 except that the blanched beans were not dehulled. The whole blanched beans exhibited a tenderometer vaue below 180.

EXAMPLE 16

Organoleptic and Objective Evaluation of Products Prepared by Examples 13, 14 and 15

Organoleptic and objective evaluations were performed on the beverages prepared in Examples 13, 14 and 15 as previously described. The results indicated that all products were highly acceptable in quality on both subjective and objective evaluations.

Although specific materials and conditions were set forth in the above exemplary processes for making the soybean beverage base of the present invention and using said base to form other food products, these are merely intended as illustrations of the present invention. Various other tenderization techniques, lipoxidase inactivation techniques, milling methods, homogenization techniques, additives, derivative food products and operating conditions such as those described hereinabove may be substituted in the examples with similar results.

Other modifications of the present invention will occur to those skilled in the art upon a reading of the present disclosure. These are intended to be included within the scope of this invention. Thus, for example, the process of the present invention can be conducted by heating enzyme active soybeans for a period sufficient to inactivate the lipoxidase but insufficient to fully tenderize the beans into the desired tenderometer range. The lipoxidase-inactivated, partially tenderized beans can then undergo partial size reduction to increase the effective bean surface area thereby increasing the rate of further tenderization. Thereafter, further tenderization can be effected into the desired range followed by further milling and homogenization to obtain a desirable beverage.

What is claimed is:

1. Process for preparing a bland, stable aqueous dispersion of soybeans comprising:
   i. heating soybean cotyledons sufficiently to inactivate the lipoxidase enzyme contained therein and to partially tenderize said soybean cotyledons,
   ii. further tenderizing said soybean cotyledons unitl the soybeans exhibit a tenderometer value of between about 16 and about 300 pounds/100 grams of soybeans; and
   iii. homogenizing an aqueous slurry of said tenderized soybeans, said slurry having a soybean concentration of less than about 20% by weight, in at least one pass through a homogenization zone at a pressure between about 1000 and 10,000 psi. at a temperature between about 32° F. and the boiling point of the slurry at the pressure within the homogenizing zone, thereby obtaining a bland, stable aqueous dispersion of soybeans.

2. Process as defined in claim 1 wherein the aqueous slurry is formed after lipoxidase inactivation but prior to further tenderization.

3. Process as defined in claim 1 wherein the aqueous slurry is formed after tenderization but before homogenization.

4. Process as defined in claim 1 wherein the soybean material is dehulled before lipoxidase inactivation.

5. Process as defined in claim 1 wherein the lipoxidase inactivated soybean material is dehulled after lipoxidase inactivation.

6. Process as defined in claim 1 wherein tenderization is effected on whole hull-containing soybeans.

7. A process for preparing a bland, stable, aqueous dispersion of soybeans comprising:
   i. heating lipoxidase enzyme active soybean cotyledons having a moisture content of 20% by weight or less, sufficiently to inactivate the lipoxidase enzyme contained therein and to partially tenderize said soybean cotyledons;
   ii. further tenderizing said soybean cotyledons until the soybeans exhibit a tenderometer value of between about 16 and about 300 pounds per 100 grams of soybeans; and
   iii. homogenizing an aqueous slurry of said tenderized soybeans, said slurry having a soybean concentration of less than about 20% by weight, in at least one pass through a homogenization zone at a pressure between about 1000 and 10,000 psi. at a temperature between about 32° F. and a boiling point of the slurry at the pressure within the homogenizing zone, thereby obtaining a bland, stable soybean dispersion.

8. The process as defined in claim 7 wherein the lipoxidase enzyme active soybean cotyledons exhibit a moisture content of from about 10 to 13% by weight.

9. The process as defined in claim 7 wherein the enzyme active soybean cotyledons have been stored in the enzyme active state less than about 48 hours prior to heating to inactivate said lipoxidase enzyme.

10. The process as defined in claim 9 wherein said enzyme actve soybean cotyledons have been stored for a period of less than about 24 hours.

11. The process as defined in claim 7 wherein heating is effected by blanching the soybeans in water at about the boiling temperature for at least about 5 minutes.

12. The process as defined in claim 11 wherein the soybeans are blanched in water for about 20 to 40 minutes.

13. The process as defined in claim 1 wherein tenderization is effected by soaking the soybeans in water until the beans are saturated therewith.

14. The process as defined in claim 13 wherein the soybeans are soaked in an alkaline aqueous solution having a pH of from about 7.5 to 8.5.

15. The process as defined in claim 14 wherein the alkaline solution is an aqueous solution of sodium bicarbonate.

16. The process as defined in claim 14 wherein the beans are soaked at room temperature for a period of about 4 to 10 hours.

17. The process as defined in claim 14 wherein the soybeans are soaked at temperatures ranging from about 77° F. to about 212° F.

18. The process as defined in claim 7 wherein heating of the beans is continued for a sufficient period of time to both inactivate the lipoxidase enzyme and to tenderize the beans to a tenderometer value of from about 16 to about 300 pounds per 100 grams of soybeans on an equivalent whole bean basis.

19. The process as defined in claim 7 wherein live steam is employed to blanket the beans during slurry formation and/or homogenization.

20. The process as defined in claim 7 wherein after lipoxidase inactivation, the soybeans are subdivided prior to completion of tenderization.

21. The process as defined in claim 13 wherein the aqueous solution in which the beans are soaked is retained to provide a portion of the aqueous medium employed in forming the soybean slurry.

22. The process as defined in claim 11 wherein the aqueous solution employed to blanch the soybeans is retained and employed to form a portion of the aqueous medium used in formation of the soybean slurry.

23. The process as defined in claim 7 wherein the enzyme active soybeans are dehulled raw soybeans.

24. A process as defined in claim 7 wherein the lipoxidase enzyme active soybean cotyledons are subdivided soybean cotyledons.

25. The process for preparing a bland, stable aqueous dispersion of soybeans comprising:
   i. heating dehulled raw soybeans having a moisture content of 20% by weight or less in boiling water for about 15 to 20 minutes;
   ii. forming an aqueous slurry of said soybeans, said slurry having a soybean concentration of less than about 20% by weight, the water employed in said slurry comprising the water employed for heating said beans plus additional water containing 0.05% sodium bicarbonate;
   iii. heating said slurry for about 20 minutes at about 180° F. to impart a tenderometer value thereto of between about 16 and about 300 pounds per 100 grams of soybeans; and
   iv. homogenizing said slurry in at least one pass through a homogenization zone at a pressure between about 1000 and 10,000 psi. at a temperature between about 32° F. and a boiling point of the slurry at the pressure within the homogenizing zone, thereby obtaining a bland, stable soybean dispersion.

26. The process as defined in claim 7 wherein the enzyme inactivated soybeans are formed into a slurry before completion of tenderization.

27. The process as defined in claim 7 wherein the enzyme inactivated soybeans are formed into a slurry after completion of tenderization but before homogenization.

28. The process as defined in claim 7 wherein the slurry contains from about 10 to 15% by weight of soybean solids.

29. The process as defined in claim 7 wherein the soybeans are tenderized to a tenderometer value of from about 16 to less than about 185 pounds per 100 grams soybeans (wet weight).

30. Process for preparing a bland, stable aqueous dispersion of soybeans comprising:
   i. heating whole raw soybeans at a temperature and for a time sufficient to substantially breakdown the gelatinous fiber that partially binds the hull to the cotyledons of the soybean and to impart a plastic texture to the cotyledons;
   ii. dehulling sid soybeans and recovering enzyme active soybean cotyledons;
   iii. heating the soybean cotyledons sufficiently to inactivate the lipoxidase enzyme contained therein and to partially tenderize said soybean cotyledons;
   iv. further tenderizing said soybean cotyledons until the soybeans exhibit a tenderometer value between about 16 and about 300 pounds/100 grams of soybeans; and
   v. homogenizing an aqueous slurry of said tenderized soybeans, said slurry having a soybean concentration of less than about 20% by weight, in at least one pass through a homogenization zone at a pressure between about 1000 and 10,000 psi. at a temperature between about 32° F. and the boiling point of the slurry at the pressure within the homogenizing zone, thereby obtaining a bland, stable aqueous dispersion of soybeans.

31. A bland, stable aqueous dispersion of whole soybeans prepared by the process of claim 1.

32. A bland, stable aqueous dispersion of whole soybeans prepared by the process of claim 4.

33. A bland, stable aqueous dispersion of whole soybeans prepared by the process of claim 5.

34. A bland, stable aqueous dispersion of whole soybeans prepared by the process of claim 6.

35. A bland, stable aqueous dispersion of whole soybeans prepared by the process of claim 7.

36. A bland, stable aqueous dispersion of whole soybeans prepared by the process of claim 22.

37. A bland, stable aqueous dispersion of whole soybeans prepared by the process of claim 30.

* * * * *